US012578263B1

(12) United States Patent
Youngquist et al.

(10) Patent No.: US 12,578,263 B1
(45) Date of Patent: Mar. 17, 2026

(54) OPTICAL WASTEWATER PRETREAT SENSOR

(71) Applicant: United States of America as Represented by the Administrator of NASA, Washington, DC (US)

(72) Inventors: Robert C. Youngquist, Cocoa, FL (US); Christopher John Biagi, Titusville, FL (US); Tracy L. Gibson, Melbourne, FL (US); Mark Nurge, Oviedo, FL (US); Upendra Nath Singh, Yorktown, VA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 186 days.

(21) Appl. No.: 18/679,648

(22) Filed: May 31, 2024

Related U.S. Application Data

(60) Provisional application No. 63/505,889, filed on Jun. 2, 2023.

(51) Int. Cl.
*G01N 21/27* (2006.01)
*G01J 3/42* (2006.01)

(52) U.S. Cl.
CPC ............... *G01N 21/27* (2013.01); *G01J 3/42* (2013.01)

(58) Field of Classification Search
CPC ............... G01N 21/27; G01J 3/42; C02F 9/00
See application file for complete search history.

(56) References Cited

U.S. PATENT DOCUMENTS

| 2015/0132789 A1* | 5/2015 | Bornheimer | .......... G01J 3/0208 356/40 |
| 2020/0061611 A1* | 2/2020 | Fry | ...................... G01F 23/292 |

FOREIGN PATENT DOCUMENTS

| CN | 105579831 B | * | 6/2019 | ............. G01N 21/53 |
| EP | 2463633 A1 | * | 6/2012 | ................ G01J 3/10 |

* cited by examiner

*Primary Examiner* — Maurice C Smith
(74) *Attorney, Agent, or Firm* — Jonathan J. Leahy; Mark Homer

(57) ABSTRACT

The subject invention is an optical sensor system for calculating the percentage of wastewater pretreat fluid within a fluid mixture. The system provides light from a light source to a transparent vessel containing a fluid mixture. The light source and a portion of the vessel are enclosed within a housing to prevent ambient light from polluting the system's measurements. Two photodiodes are placed within the housing to measure the characteristics of the light. One photodiode is placed in a location prior to the light reaching the vessel to measure the characteristics of light emanating from the light source and a second photodiode is placed in a location to measure the characteristics of the light after it has traversed through the vessel and fluid mixture. Using data collected by the photodiodes, a microprocessor can determine the characteristics of the fluid mixture, and more specifically, the percentage of a pretreat fluid within the fluid mixture.

17 Claims, 7 Drawing Sheets

OPTICAL WASTEWATER PRETREAT SENSOR

CROSS REFERENCE TO RELATED APPLICATIONS

This application claims the benefit of priority under 35 U.S.C. § 119 (e) from U.S. Provisional Patent Application Ser. No. 63/505,889 filed on Jun. 2, 2023, the contents of which are incorporated herein by reference.

ORIGIN OF THE INVENTION

The invention described herein was made in part by employees of the United States Government and may be manufactured and used by or for the Government of the United States of America for governmental purposes without payment of any royalties thereon or therefor.

FIELD OF THE INVENTION

The present invention relates generally to optical sensors, and more specifically to optical sensors used to determine the percentage of a pretreat fluid within a fluid mixture.

DESCRIPTION OF THE RELATED ART

Processing human waste in space can be challenging, particularly during long-duration spaceflight, where processing and recovery of water and nutrients from wastewater may be critical to avoid costly launch/resupply of water and nutrients to the crew. Future exploration vehicles being developed by the National Aeronautics and Space Administration (NASA) will also have smaller habitable volumes than the International Space Station (ISS). As habitable volumes decrease, so should toilet hardware so that crew comfort can be preserved. Having a universal, standardized toilet design that can be adapted for multiple vehicles reduces overall costs.

Newer toilet systems for use in space have a lower mass and volume than prior systems, are simpler to use, and provide increased crew comfort and performance. In addition, the system treats urine so that it can be safely processed by spacecraft recycling systems. A key feature of the newer systems is the urine pretreatment dose pump/pretreatment quality indication device which enables water recovery from urine. The pretreat solution used in this feature needs to be within a specific range to be suitable for enabling water recovery from urine, so monitoring this percentage is critical to the effective operation of the toilet systems.

Specifically, the ISS Universal Waste Management System (UWMS) has a tank of concentrated pretreat solution used to stabilize urea (to prevent hydrolysis to $NH_3/NH_4+$, prevent increasing pH, and prevent salt precipitate formation) and prevent microbial growth in the urine. A dose of this pretreat is drawn from the tank and mixed with ISS potable water, diluting the pretreat to 6.7±1% (by volume) concentration before using it to treat urine. If the mixed pretreat concentration is too low, then the urine will begin to hydrolyze and precipitate, and biofilms may form that can cause hardware failures. If the pretreat concentration is too high, then it poses an increased risk to hardware due to the lowered pH, and the concentrated pretreat solution will be consumed too quickly.

Current state-of-the-art sensors for monitoring the percentage of pretreat solution are conductivity sensors. The conductivity sensor typically operates by placing electrodes into the diluted pretreat mixture prior to its addition to urine and flowing current through the diluted pretreat to measure the conductivity. This reading is converted to a concentration. In operation, however, the output voltage from this type of sensor decays over time, yielding an unreliable measurement. The probable cause for this is an interaction between the electrodes and the diluted pretreat solution causing current flow decay. Therefore, an alternative sensing and measurement system was required that did not come into physical contact with the diluted pretreat solution.

SUMMARY OF THE INVENTION

To address the issues associated with the current art, the subject invention is an optical sensor system for calculating the percentage of wastewater pretreat fluid within a fluid mixture. The system provides light from a light source to a transparent vessel containing a fluid mixture (for the purposes of this application, "transparent" means that at least some light can pass through (e.g., transparent, translucent)). The light source and a portion of the vessel are enclosed within a housing to prevent ambient light from polluting the system's measurements. Two photodiodes are placed within the housing to measure the characteristics of the light. One photodiode is placed in a location prior to the light reaching the vessel to measure the characteristics of light emanating from the light source, and a second photodiode is placed in a location to measure the characteristics of the light after it has traversed through the vessel and the fluid mixture. Using data collected by the photodiodes, a microprocessor can determine the characteristics of the fluid mixture, and more specifically, the percentage of a pretreat fluid within the fluid mixture.

Specifically, the system comprises a housing with four holes: 1) a through hole, 2) a cylindrical hole, 3) a light source measuring hole, and 4) a pretreat measuring hole. The through hole goes through the housing wherein a transparent vessel is inserted so that the housing encapsulates a portion of the transparent vessel. The vessel contains a fluid mixture comprising a percentage of a pretreat fluid.

The cylindrical hole is positioned perpendicular to the through hole so that it connects the exterior of the housing to the transparent vessel. The cylindrical has two diameters, a first, larger diameter and a second, smaller diameter. A light source is inserted into the cylindrical hole so that the light source is positioned adjacent to the exterior of the housing. The light source emanates light throughout the cylindrical hole, wherein some light is reflected back through the cylindrical hole by the narrowing of the cylindrical hole from the first diameter to the second diameter, and some light emanates through cylindrical hole into the transparent vessel and the fluid mixture, reflecting off the housing encapsulating the transparent vessel.

The light source measuring hole is positioned perpendicular to the cylindrical hole, so that the light source measuring hole connects the exterior of the housing to the cylindrical hole along its first diameter. A light source photodiode is inserted into the light source measuring hole so that it is positioned adjacent to the exterior of the housing. The light source photodiode measures the characteristics of the light reflected back through the cylindrical hole and into the light source measuring hole by the narrowing of the cylindrical hole from the first diameter to the second diameter.

The pretreat measuring hole is positioned perpendicular to the through hole so that it connects the exterior of the housing to the transparent vessel. A pretreat photodiode is inserted into the pretreat measuring hole so that it is positioned adjacent to the exterior of the housing. The pretreat photodiode measures the light reflected off the housing encapsulating the transparent vessel after the light has passed through both the transparent vessel and the fluid mixture. Once the light has been measured by the light source photodiode and the pretreat photodiode, a microprocessor connected to both photodiodes uses the data from the photodiodes to calculate the percentage of the pretreat fluid in the fluid mixture.

BRIEF DESCRIPTION OF THE DRAWINGS

In the drawings, which are not necessarily to scale, like or corresponding parts are denoted by like or corresponding reference numerals.

FIG. 11 depicts a circuit used by the microprocessor to turn LED off and on.

DETAILED DESCRIPTION OF THE INVENTION

Figure 1:
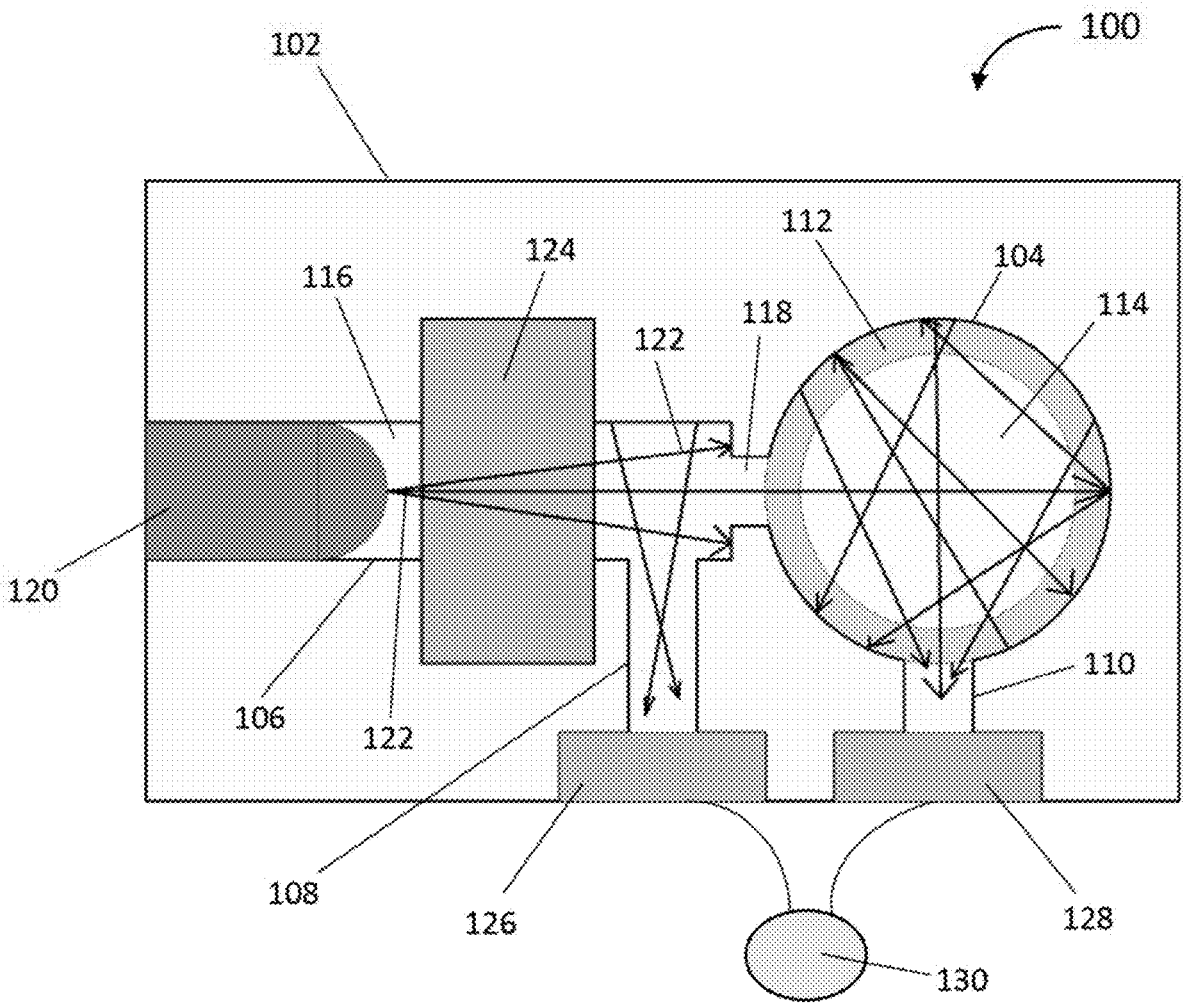
FIG. 1 depicts a view of an embodiment of the present invention.

The primary goal of the subject invention is to demonstrate an optical sensor that can monitor the concentration of pretreat in water from 2.7% to 10.7% (by volume) to +1% accuracy. The ideal concentration range is 6.7±1%. During the initial stages of development, six different concentrations of pretreat in pure water were prepared, corresponding to 3%, 5%, 7%, 9%, 11%, and 13% concentrations. Transmission spectra were taken of these using 5-mm and 10-mm cuvettes and the results were used to construct an absorption curve. These measurements verified that the transmission through this material obeys Beer's Law, allowing modeling of selected optical sources and path lengths. Beer's law states that the transmission of material varies as:

$$T(\lambda) = 10^{\{-\alpha(\lambda) \times p\}}$$

where $\lambda$ is the wavelength, $\alpha(\lambda)$ is the absorbance with units of inverse centimeters (cm) and inverse %, x is the path length in cm, and p is the % pretreat concentration. It was determined that the ideal wavelength range to use for the sensor was between 500 and 600 nm, a region where there was sufficient absorption to measure the concentration of pretreat yet leave adequate light to ensure a reasonable signal to noise level. The present invention was therefore developed as an optical pretreat sensor based on Beer's Law.

Making an optically based pretreat concentration sensor requires light to pass through the water/pretreat solution. This can be achieved by installing windows on opposing sides of a flow line, but this adds possible leak sites. Instead, a tube made from a material that allows light to pass through it and interact with the pretreat fluid was used. Specifically, perfluoroalkoxy (PFA) tubing, which is translucent, was used to develop a sensor that would look through the PFA walls at the pretreat. PFA is a tough, chemically resistant material that is approved for carrying pretreat solutions. Looking through the PFA at the pretreat would remove the need for windows, simplifying the sensor design.

The team developed a PFA-based pretreat concentration sensor by using a "white cell" or integrating sphere approach. A white cell is an enclosed volume whose inner surface is coated with a highly scattering, minimally absorbing material, where light enters through an opening and is detected at a second opening, but where the two openings are not aligned. Light enters the cell and scatters off the inner walls, reflecting until a portion reaches the detector. Doing this allows the light to propagate throughout the volume, filling the volume with light, and allowing spectroscopy to proceed without having to worry about refraction issues.

Modifying the white cell concept, an optical pretreat concentration sensor was developed where the PFA tube is surrounded by a scattering surface, such as a light-reflective material. Initial work showed that a 525-nm center wavelength LED would work as an appropriate light source, but that some filtering might improve the response, so a position for an optional filter holder was included in the invention. The light, before entering the PFA, is partially scattered so that a light source photodetector can monitor the LED output to account for variations. Most of the light passes through an opening and enters the region containing the PFA tube and pretreat. This light bounces off the inner surface walls, interacting with the pretreat from multiple directions, before a portion reaches the pretreat photodiode, whose output is an indication of the amount of pretreat in the tube. By scattering the light off the inner surface walls, refraction by the curved PFA tubing is not an issue since the light is scattered in all directions. Also, this approach does not require external optics (e.g., lenses) to collimate or collect light.

Figure 3:
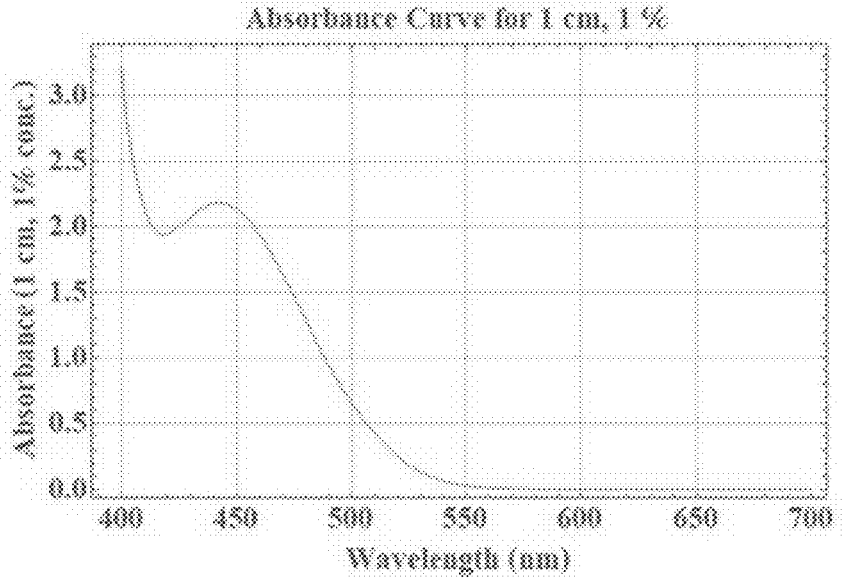
FIG. 3 depicts the absorbance curve used to model optical pretreat sensors.

Spectral transmission measurements of pretreat versus concentration were made, resulting in an absorbance function, $\alpha(\lambda)$, of wavelength, $\lambda$. This function is shown in FIG. 3, displaying the absorbance of a 1% pretreat concentration over a 1-cm path length. Consequently, from Beer's Law, the transmission through the pretreat at any given wavelength is expressed as $$T(\lambda, x, p) = 10^{(-\alpha(\lambda) x p)}$$

where x is the path length in cm, and p is the percent of pretreat concentration.

Figure 4:
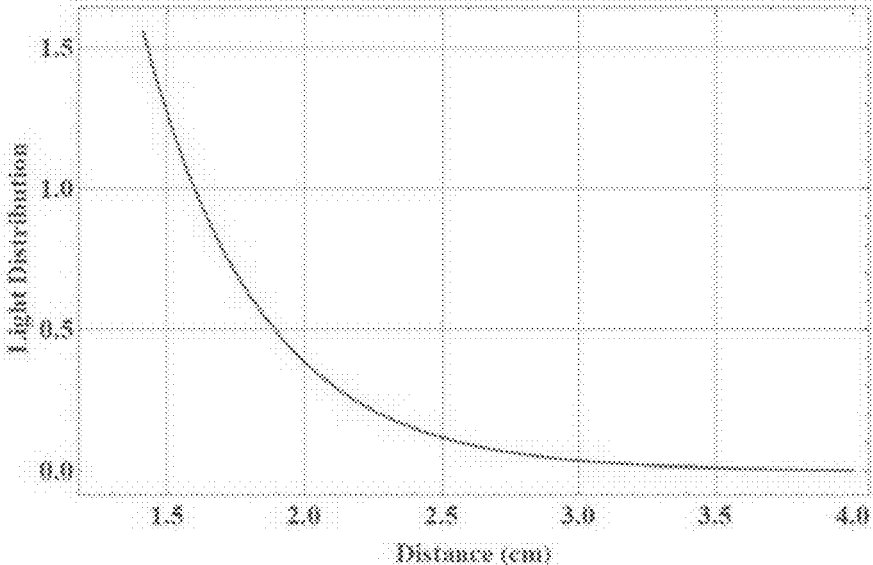
FIG. 4 depicts an example of light versus distance travelled that reaches the photodetector.

However, with the white cell approach for monitoring pretreat, there is no single path length, so a generalization of Beer's Law is needed. Assuming each time light impinges on the scattering surface that the same fraction of light is lost (i.e., is absorbed or scattered), indicates that the fractional amount of light, S(x), that can reach the detector decreases exponentially with the distance it travels within the tube. In other words, the longer the light stays in the tube, the more likely it is that it has scattered within the tube or been absorbed and is no longer available for detection. Mathematically this is expressed as $$S(x) = kLn[10]10^{(-b(x-x_1))}$$

where k is the decay rate of the light versus distance, $x_1$ is the shortest distance traveled by the light, and the factor b Ln[10] normalizes the function (i.e., its integral from $x_1$ to infinity is 1, allowing this to be used as a distribution or density function). An example of this function is shown in FIG. 4 when the decay rate, k, is 1.029 cm$^{-1}$ and the minimal distance, $x_1$, is 1.235 cm. These two parameters will be determined by fitting to the experimental data taken from the sensor.

If pretreat is present, then the proportional amount of light, $I(\lambda, x, p)$, that reaches the photodetector after having travelled a distance, x, is determined by scattering losses and absorption and is represented by the product of the distribution function, $S(x)$, and the Beer's Law transmission, $T(\lambda, x, p)$, $$I(\lambda,x,p)=I_0 S(x)T(\lambda,x,p)=I_0(kLn[10]10^\wedge(-k(x-x_1)))10^\wedge(-\alpha(\lambda)xp)$$

where $I_0$, is a proportionality constant. The total amount of light at any one wavelength that reaches the photodetector, $I(\lambda, p)$, is equal to the integral of this function over all path lengths from the minimal distance, $x_1$, to infinity. Integrating $I(\lambda, x)$, yields $$I(\lambda, p) = I_0 \int_{x_1}^{\infty} I(\lambda, x)dx = I_0 \frac{10^\wedge(-\alpha(\lambda)x_1 p)}{1+\alpha(\lambda)p/b}$$

where Beer's Law has been recovered with an additional term in the denominator. This function is plotted in FIG. 5 when the decay rate, k, is 1.029 cm$^{-1}$, the minimal distance, $x_1$, is 1.235 cm, and at three wavelengths, 515 nm, 525 nm, and 535 nm.

Figure 6:
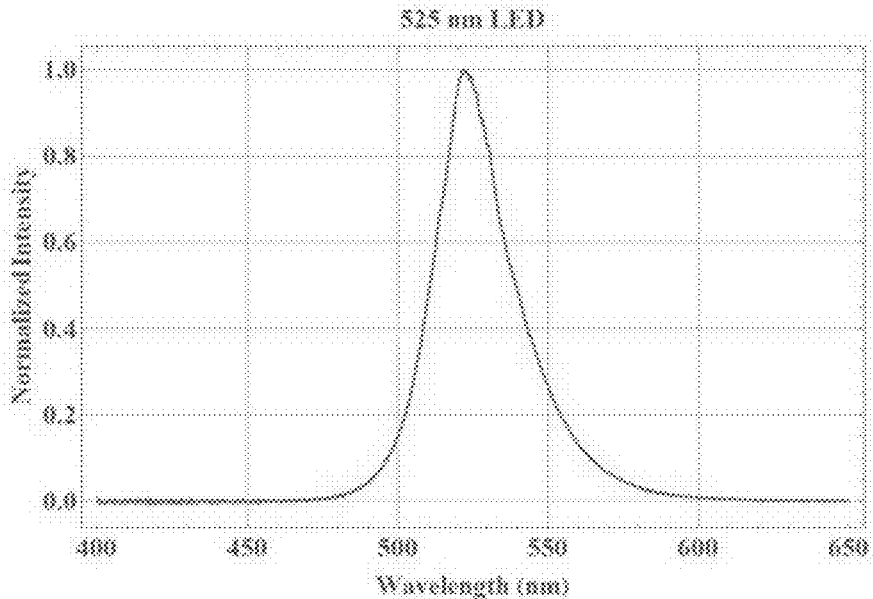
FIG. 6 depicts a normalized intensity for ThorLabs 525 nm LED.

The light source used in the sensor is a light emitting diode (LED) with a 525-nm center wavelength and a bandwidth of about 30 nm. Its normalized spectrum, $L(\lambda)$, is shown in FIG. 6. The total light, $I(p)$, hitting the detector is then proportional to the integral of the LED spectrum, $L(\lambda)$, times the wavelength dependent transmission through the scattering region, $I(\lambda, p)$, over a band that includes the LED emission spectra, 400 nm to 650 nm.

$$I(p) = \int_{400}^{650} L(\lambda)I(\lambda, p)d\lambda$$

The function, $I(p)$, is not expressible in closed form, but can be numerically evaluated.

In practice, an inverted function is needed where concentration, p, can be found from the normalized, light intensity, I. Evaluating this numerically, a reasonably good fit can be achieved by using the function $$p = a\frac{(I-1)}{\left(b+cI+dI^2\right)}$$

Figure 5:
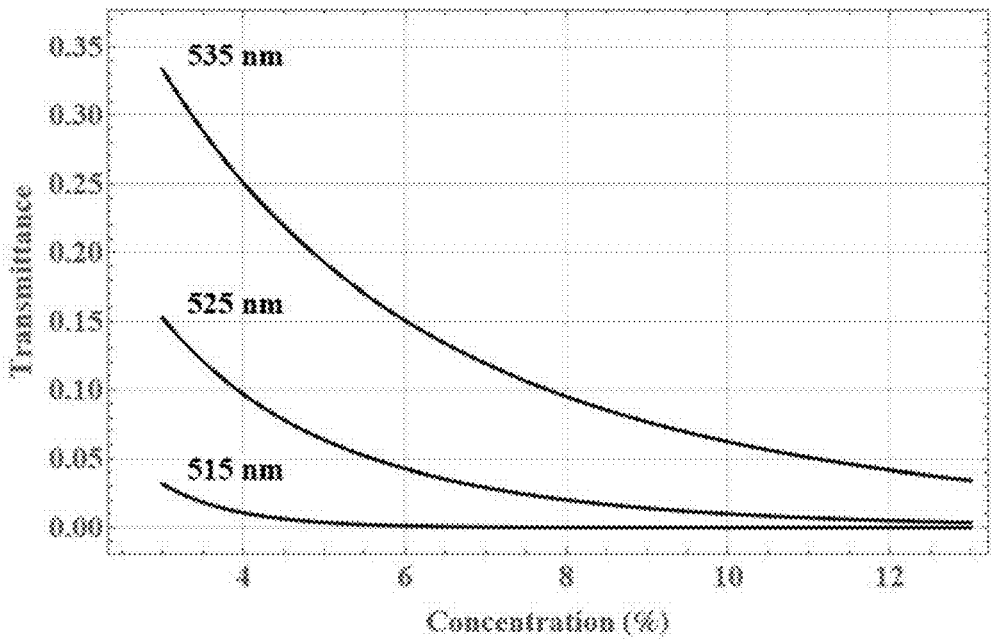
FIG. 5 depicts transmittance versus concentration for three different wavelengths passing through the scattering region.
Figure 7:
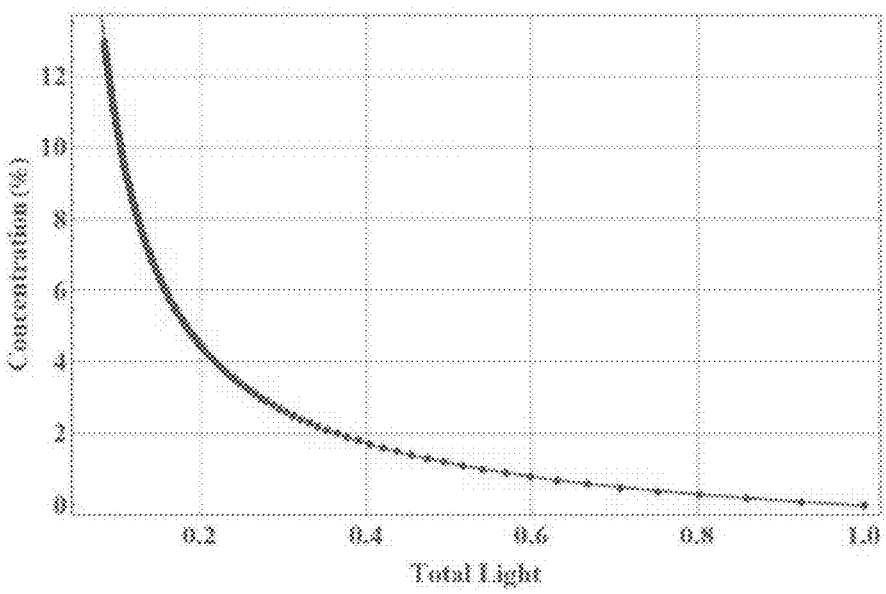
FIG. 7 depicts conversion from light measurement to concentration.

For the parameters used in the example plots shown in FIGS. 4 and 5, where the decay rate, k, is 1.029 cm$^{-1}$, and the minimal distance, $x_1$, is 1.235 cm, the following values yield an acceptable fit to the numerical function, $\alpha$=−6.93278, b=−0.0882987, c=6.99981, and d=−1.85627. The plot shown in FIG. 7 shows the function (solid) line and the numerically determined values (red dots). This function is used by the microprocessor to find the pretreat concentration as a function of measured light intensity.

Figure 2:
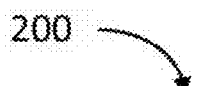
FIG. 2 is a method for using the optical sensor system for calculating the percentage of pretreat fluid within a fluid mixture.
Figure 2:
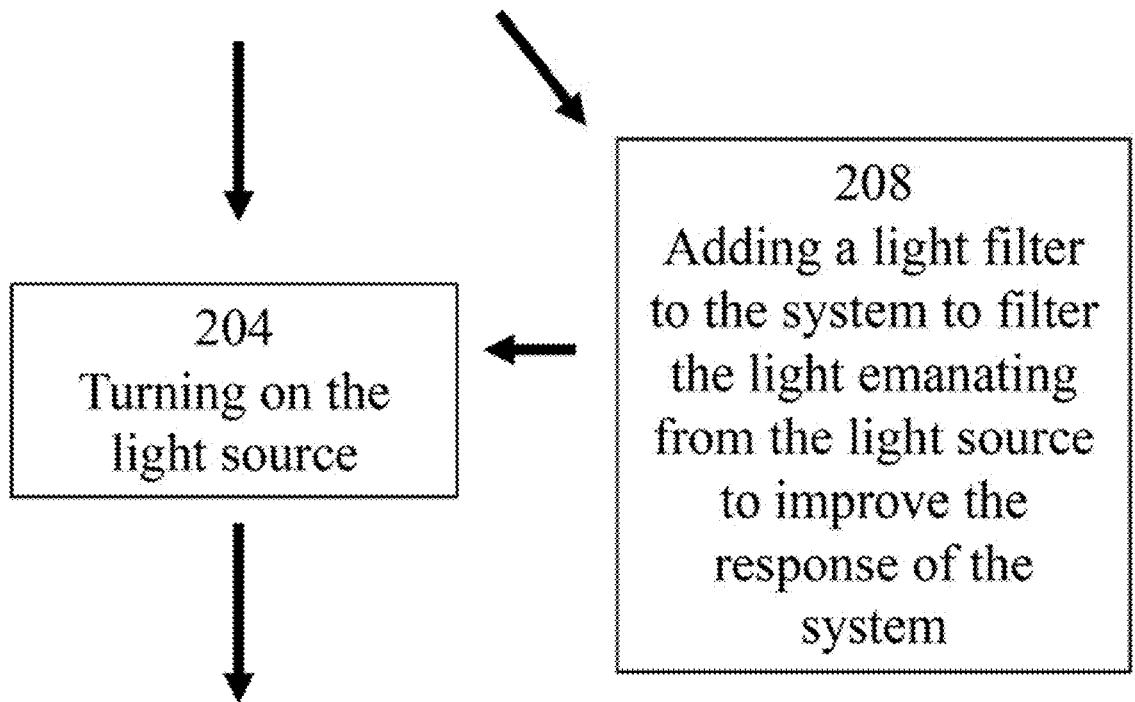

Referring to FIGS. 1 and 2, the present invention is an optical sensor system for determining the percentage of pretreat fluid within a fluid mixture. The system 100 comprises a housing 102 with four holes: a through hole 104, a cylindrical hole 106, a light source measuring hole 108, and a pretreat measuring hole 110. The through hole 104 goes through the housing so that a transparent vessel 112 can be inserted through the through hole 104 so that the housing 102 encapsulates at least a portion of the transparent vessel 112. The transparent vessel 112 contains a fluid mixture 114 comprising a percentage of pretreat fluid.

The housing 102 can be any size, shape, and material known to one of skill in the art that can be selected based on the desired characteristics of the system 100. In the preferred embodiment, the housing is made from aluminum. In alternate embodiments, the housing is made from a light-reflective material such as Teflon™.

Teflon™ was initially chosen for the housing because it is bright white, non-absorbing, and scatters light well. However, light is lost propagating through the Teflon™, and ambient light can get through the Teflon™ and reach the photodiodes 126, 128 (described below). Neither of these is desirable. Any light lost traveling through the Teflon™ cannot reach the photodiodes 126, 128, and light reaching the photodiodes 126, 128 from outside light sources can cause measurement issues. In addition, the transparency of the Teflon™ can cause cross talk between the two photodiodes 126, 128, so that their measurements are skewed. Therefore, in the preferred embodiment, the housing 102 is made from sand-blasted aluminum.

The through hole 104 through the housing 102 must be approximately the same size and shape as the transparent vessel 112 so that there is very little gap between the transparent vessel 112 and the housing 102. The size and shape of both the through hole 104 and the transparent vessel 112 can be any size and shape known to one of skill in the art based on the desired characteristics of the system 100. The material of the transparent vessel 112 can be any material known to one of skill in the art to allow light to pass through and interact with the fluid mixture 114. In the preferred embodiment, the through hole 104 is cylindrical and the transparent vessel 112 is a perfluoroalkoxy (PFA) cylindrical tube. PFA tubing is used by the food industry and has excellent chemical resistance to a wide variety of acids. It is semi-flexible, accommodating gradual bends. It is flame retardant and contains extremely low levels of additives, so it will not contaminate the fluid. PFA tubing is also approved for pretreat flow.

The tolerance for the gap between the transparent vessel 112 and through hole 104 can be selected by one of skill in the art based on the desired characteristics of the system 100. The fluid mixture 114 within the transparent vessel 112 can comprise any fluids known to one of skill in the art. In the preferred embodiment, the mixture 114 comprises water and a pretreat fluid such as phosphoric acid chromium trioxide (also known as phosphochromic acid).

The cylindrical hole 106 is positioned perpendicular to the through hole 104 so that it connects the exterior of the housing 102 to the transparent vessel 112. The cylindrical hole 106 has a first diameter 116 and a second diameter 118, wherein the first diameter 116 is larger than the second diameter 118. The first diameter 116 and the second diameter 118 can be selected by one of skill in the art as appropriate for the desired system characteristics.

A light source 120 is positioned adjacent to the exterior of the housing 102 within the cylindrical hole 106 so that it emanates light 122 throughout the cylindrical hole 106, wherein some light 122 is reflected back through the cylindrical hole 106 by the narrowing of the cylindrical hole 106 from the first diameter 116 to the second diameter 118. Some of the light 122 emanates through cylindrical hole 106 into the transparent vessel 112 and the fluid mixture 114, and reflects off the housing 102 encapsulating the transparent vessel 112. The light source 120 can be selected by one of skill in the art to have any size, shape, color, and power source to produce the desired characteristics of the system 100. In the preferred embodiment, the light source 120 is a light emitting diode (LED) where the wavelength range of the LED comprises 400 to 700 nm center wavelength. In one embodiment, a ThorLabs LED with a 525-nm center wavelength and a bandwidth of about 30 nm was used as the light source 120.

In an alternate embodiment, to provide further control for the characteristics of light 122 emanating from the light source 120, a light filter 124 can be positioned within the first diameter 116 of the cylindrical hole 106 to filter the light 122 emanating from the light source 120 to improve the response of the system 100. The properties of the light filter 124 can be selected by one of skill in the art to produce the desired characteristics of the system 100. The filter is not used in the preferred embodiment since results indicated that the LED spectrum yielded an acceptable sensor response, so the light 122 did not need to be filtered.

The light source measuring hole 108 is positioned perpendicular to the cylindrical hole 106 to connect the exterior of the housing 102 to the cylindrical hole 106 along its first diameter 116. The characteristics of the light source measuring hole 108, such as size and shape, can be selected by one of skill in the art to produce the desired characteristics of the system 100. In the preferred embodiment, the light source measuring hole 108 is cylindrical.

A light source photodiode 126 is positioned adjacent to the exterior of the housing 102 within the light source measuring hole 108 that measures the light 122 reflected back through the cylindrical hole 102 by the narrowing of the cylindrical hole from the first diameter to the second diameter. This scattering of light 122 throughout the cylindrical hole 106 by the narrowing of the cylindrical hole 106 from the first diameter 116 to the second diameter 118 also reflects light 122 into the light source measuring hole 108 so that the light source photodiode 126 can measure the characteristics of the light 122 emanating from the light source 120. The light source photodiode 126 monitors the light source 120 output to account for variations in light 122 that may impact the calculation of the percentage of pretreat fluid in the fluid mixture 114. The light source photodiode 126 can be any photodiode known to one of skill in the art to measure the desired characteristics of light 122 within the system 100.

The pretreat measuring hole 110 is positioned perpendicular to the through hole 104 to connect the exterior of the housing 102 to the transparent vessel 112. The characteristics of the pretreat measuring hole 110, such as size and shape, can be selected by one of skill in the art to produce the desired characteristics of the system 100. In the preferred embodiment, the pretreat measuring hole 110 is cylindrical.

A pretreat photodiode 128 is positioned adjacent to the exterior of the housing 102 within the pretreat measuring hole 110 to measure the light reflected off the housing 102 encapsulating the transparent vessel 112 after the light 122 has passed through both the transparent vessel 112 and the fluid mixture 114. The scattering of light 122 reflected off the housing 102 throughout the transparent vessel 112 and the fluid mixture 114 causes some light 122 to enter the pretreat measuring hole 110 so that the pretreat photodiode 128 can measure the characteristics of the light 122 after it has passed through the fluid mixture 114. The pretreat photodiode 128 can be any photodiode known to one of skill in the art to measure the desired characteristics of light 122 after it has passed through the fluid mixture 114.

A microprocessor 130 connected to both photodiodes 126, 128 uses data from the photodiodes 126, 128 to calculate the percentage of the pretreat fluid in the fluid mixture 114. The microprocessor 130 can have any characteristics known to one of skill in the art to be able to calculate data generated by photodiodes. In the preferred embodiment, the percentage of pretreat fluid in the fluid mixture 114 is calculated from the data collected by the light source photodiode 126 and the pretreat photodiode 128 using an inverted form of a modified Beer's Transmission Law as presented above. However, one of skill in the art can program the microprocessor 130 to perform any desired calculations from the data measured by the light source photodiode 126 and the pretreat photodiode 128. While the preferred embodiment is designed to measure the percentage of pretreat fluid within a fluid mixture 114, the system 100 can be altered to determine the percentage concentration of any fluid known to one of skill in the art in a fluid mixture 114 as long as the fluid has a chromophore that can be utilized to determine its concentration within the fluid mixture 114.

Figure 8:
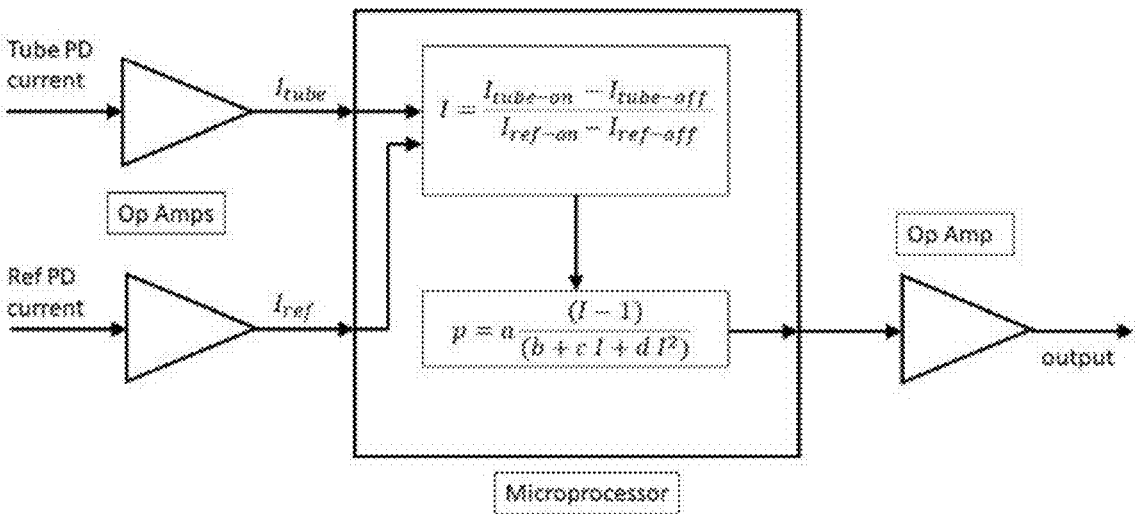
FIG. 8 depicts a block diagram showing processing of optical signals.

The relationship between light and concentration is sufficiently nonlinear (see FIG. 7) that the microprocessor-based signal processing approach was chosen to allow digital conversion from the light measurements to an analog concentration voltage, calculating the correct amount of pretreat fluid in the sensor. FIG. 8 shows a block diagram of the analog and digital processing. The currents from the tube and reference photodiodes (PDs) are converted to voltages and sent to the microprocessor, where a normalized intensity is calculated by removing offset signals with the LED turned off and by dividing the tube/pretreat signal by the reference signal. The normalized intensity is used to calculate a pretreat concentration using the formula derived above. An analog output voltage is generated, which is scaled and buffered to provide the ISS Program-specified 0-V to 10-V output signal.

Figure 9:
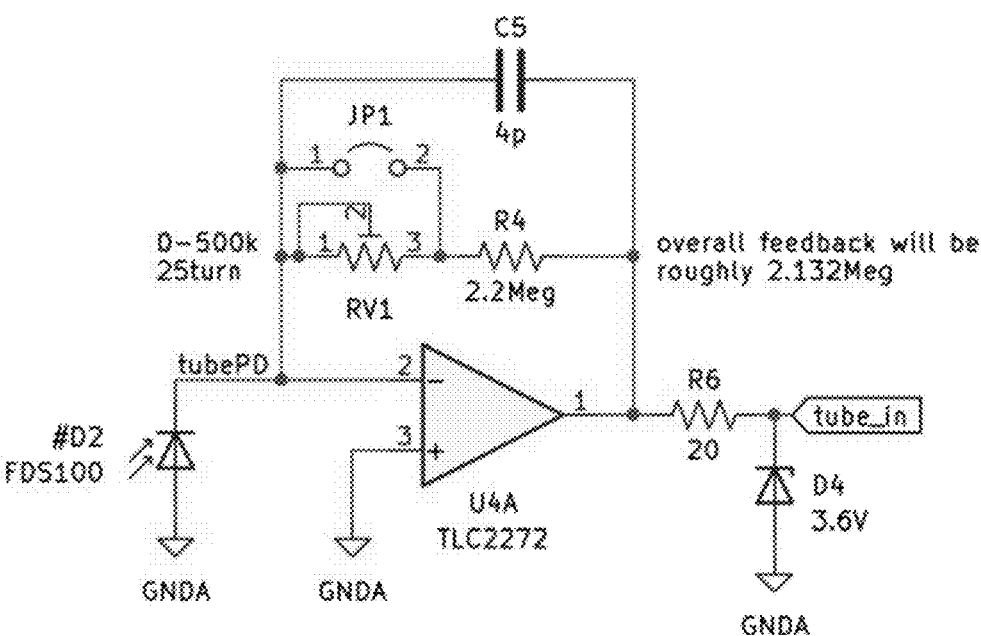
FIG. 9 depicts sensor photodiode current-to-voltage converters for the pretreat photodiode.
Figure 10:
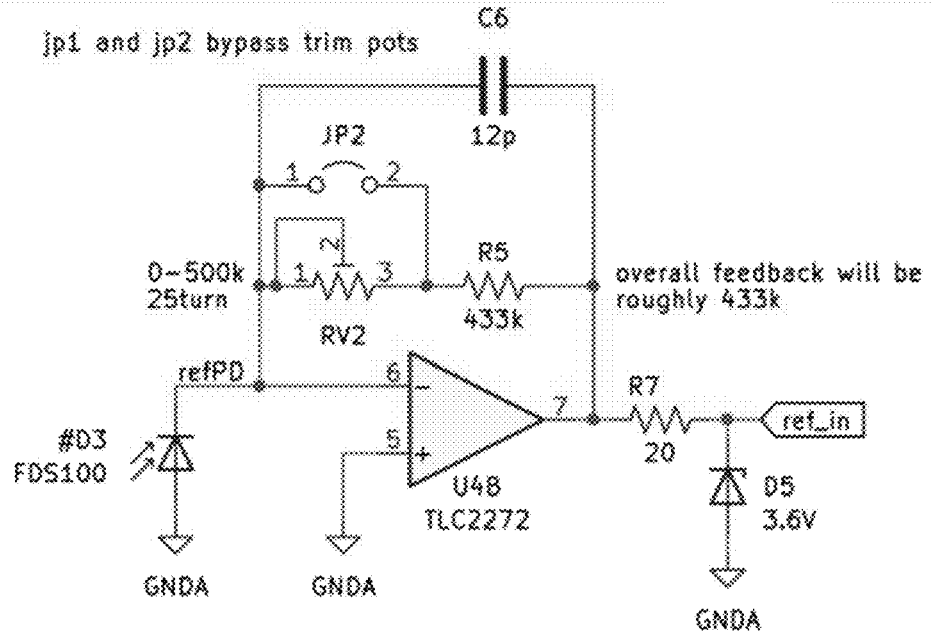
FIG. 10 depicts sensor photodiode current-to-voltage converters for the light source photodiode.

The photodiode circuits are shown FIGS. 9 and 10. Each photodiode is treated as a current source, and a Junction Field Effect Transistor (JFET) operational amplifier (a TLC2272) is used to convert this current to a voltage. The amount of light seen by the reference photodiode (also referred to as the light source photodiode 126) is greater than the amount seen by the tube photodiode (also referred to as the pretreat photodiode, 128), so the feedback resistor is lower to bring the two signals into an optimal range for the microprocessor analog-to-digital converter. In practice, the trim potentiometers are used to adjust the outputs of the two operational (op) amps to be 3 V when only water is present in the PFA tube. Clamping diodes are placed on the op amp outputs to protect the inputs to the microprocessor 130.

Figure 11:
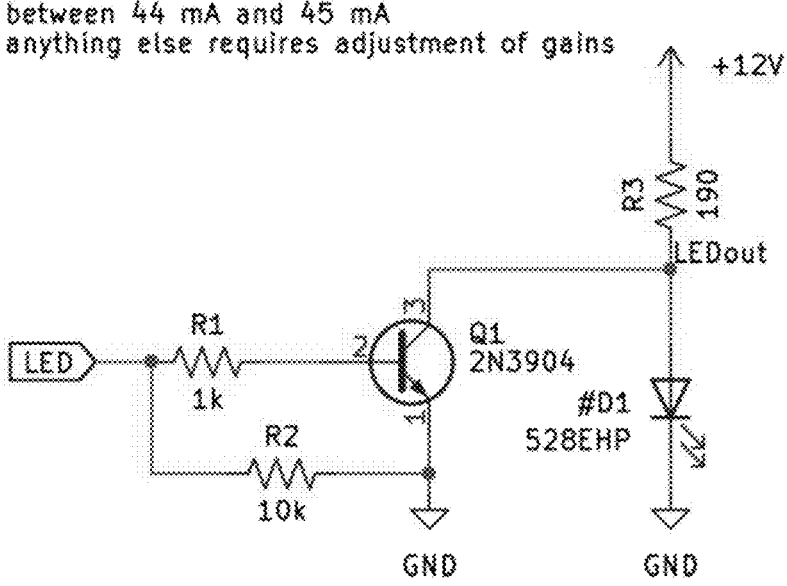

The sensor system 100 is operated by cycling the LED at 1 KHz and then monitoring the photodiodes 126, 128 when dark and when lit and subtracting the two measurements. Doing this substantially reduces 1/f noise and minimizes interference from ambient light sources. The microprocessor 130 controls the light source 120 LED using the circuit shown in FIG. 11.

In one embodiment, the microprocessor is a Teensy 3.2 with a 1-msec response time providing an updated signal once per LED cycle. This is a universal serial bus (USB) compatible processor that can sample the two photodiode

US 12,578,263 B1

Figure 12:
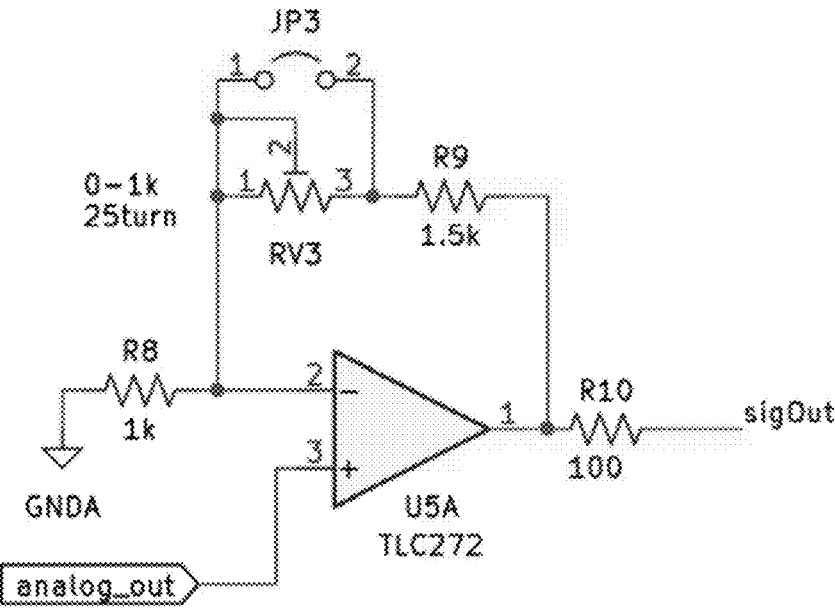
FIG. 12 depicts a circuit used to generate 0-V to 10-V analog output range representing pretreat concentration.

9 channels to 16-bit resolution. It averages and then processes the signals to calculate the pretreat concentration and then generates a 0-V to 3.3-V analog output signal proportional to this concentration. A 3.0 times amplifier, shown in FIG. 12 is used to amplify the processor output to the ISS Program specified 0-V to 10-V V range.

In an alternate embodiment of the present invention, instead of selecting a housing 102 made from a light-reflective material, one could coat a light-reflective material on the surface of each of the holes 104, 106, 108, 110. The light-reflective coating would allow the system 100 to operate similarly to the embodiment where the housing 102 is made from a light-reflective material. Any highly reflective material known to one of skill in the art could be used as the coating or scattering surface (such as barium sulfate or yttrium oxide), but in the preferred version of this alternate embodiment, the light-reflective coating comprises aluminum or Teflon™

In a method 200 for using the preferred embodiment of the optical sensor system for calculating the percentage of pretreat fluid within a fluid mixture described above, in the first step 202, the user provides a system for calculating the percentage of pretreat fluid within a fluid mixture, comprising a housing with a through hole for a transparent vessel containing a fluid mixture, a cylindrical hole through which a light source emits light, a hole for a light source photodiode, a hole for a pretreat photodiode, and a microprocessor connected to both photodiodes.

In the second step 204, the user turns on the light source, wherein some light is scattered within the cylindrical hole to the light source photodiode, and some light emanates through the transparent vessel and the fluid mixture to be reflected by the housing to the pretreat photodiode.

In the third step 206, the data from the light collected by the photodiodes is provided to a microprocessor that calculates the percentage of a pretreat fluid in the fluid mixture using the data provided by the light source photodiode and the pretreat photodiode.

In another embodiment of this method, an additional step 208 is added between the first step 202 and the second step 204. In this additional step 208, a light filter is added to the cylindrical hole between the light source and the transparent vessel to filter the light emanating from the light source to improve the response of the system.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

We claim:
1. An optical sensor system for calculating the percentage of pretreat fluid within a fluid mixture comprising:
a housing with four holes, comprising
a through hole through the housing in which a transparent vessel is inserted so that the housing encapsulates a portion of the transparent vessel, wherein the transparent vessel contains a fluid mixture comprising a percentage of a pretreat fluid;
a cylindrical hole positioned perpendicular to the through hole that connects the exterior of the housing to the transparent vessel, comprising
a first diameter and a second diameter, wherein the first diameter is larger than the second diameter, and

a light source positioned adjacent to the exterior of the housing within the cylindrical hole that emanates light throughout the cylindrical hole, wherein
some light is reflected back through the cylindrical hole by the narrowing of the cylindrical hole from the first diameter to the second diameter, and
some light emanates through cylindrical hole into the transparent vessel and the fluid mixture, and reflects off the housing encapsulating the transparent vessel;
a light source measuring hole positioned perpendicular to the cylindrical hole, wherein the light source measuring hole connects the exterior of the housing to the cylindrical hole along its first diameter, and
a pretreat measuring hole positioned perpendicular to the through hole that connects the exterior of the housing to the transparent vessel;
a light source photodiode positioned adjacent to the exterior of the housing within the light source measuring hole that measures the light reflected back through the cylindrical hole by the narrowing of the cylindrical hole from the first diameter to the second diameter;
a pretreat photodiode positioned adjacent to the exterior of the housing within the pretreat measuring hole that measures the light reflected off the housing encapsulating the transparent vessel after the light has passed through both the transparent vessel and the fluid mixture; and
a microprocessor connected to both photodiodes that uses data from the photodiodes to calculate the percentage of the pretreat fluid in the fluid mixture.

2. The optical sensor system for calculating the percentage of pretreat fluid within a fluid mixture of claim 1 wherein the housing comprises a light-reflective material.

3. The optical sensor system for calculating the percentage of pretreat fluid within a fluid mixture of claim 2, wherein the light-reflective material comprises aluminum or Teflon™.

4. The optical sensor system for calculating the percentage of pretreat fluid within a fluid mixture of claim 1, wherein the four holes are coated with a light-reflective material.

5. The optical sensor system for calculating the percentage of pretreat fluid within a fluid mixture of claim 4, wherein the light-reflective material comprises aluminum, barium sulfate, yttrium oxide, or Teflon™.

6. The optical sensor system for calculating the percentage of pretreat fluid within a fluid mixture of claim 1, wherein the light source comprises a light emitting diode (LED).

7. The optical sensor system for calculating the percentage of pretreat fluid within a fluid mixture of claim 6, wherein the wavelength range of the LED comprises 400 to 700 nm center wavelength.

8. The optical sensor system for calculating the percentage of pretreat fluid within a fluid mixture of claim 1, wherein the percentage of pretreat fluid in the fluid mixture is calculated from the data collected by the light source photodiode and the pretreat photodiode using an inverted form of a modified Beer's Transmission Law.

9. The optical sensor system for calculating the percentage of pretreat fluid within a fluid mixture of claim 1, wherein the light source photodiode monitors the light source output to account for variations in light that may impact the calculation of the percentage of pretreat fluid in the fluid mixture.

10. The optical sensor system for calculating the percentage of pretreat fluid within a fluid mixture of claim 1, wherein the through hole and the transparent vessel are cylindrical.

11. The optical sensor system for calculating the percentage of pretreat fluid within a fluid mixture of claim 1, wherein the transparent vessel comprises a material that allows light to pass through and interact with the fluid mixture.

12. The optical sensor system for calculating the percentage of pretreat fluid within a fluid mixture of claim 1, wherein the transparent vessel comprises a perfluoroalkoxy (PFA) tube.

13. The optical sensor system for calculating the percentage of pretreat fluid within a fluid mixture of claim 1, wherein the pretreat fluid comprises phosphoric acid chromium trioxide.

14. The optical sensor system for calculating the percentage of pretreat fluid within a fluid mixture of claim 1, wherein the fluid mixture comprises phosphoric acid chromium trioxide and water.

15. The optical sensor system for calculating the percentage of pretreat fluid within a fluid mixture of claim 1, further comprising a light filter positioned within the first diameter of the cylindrical hole to filter the light emanating from the light source to improve the response of the system.

16. A method for using the optical sensor system for calculating the percentage of pretreat fluid within a fluid mixture, comprising the steps of:

providing a system for calculating the percentage of pretreat fluid within a fluid mixture, comprising a housing with a through hole for a transparent vessel containing a fluid mixture, a cylindrical hole through which a light source emits light, a hole for a light source photodiode, a hole for a pretreat photodiode, and a microprocessor connected to both photodiodes;

turning on the light source, wherein some light is scattered within the cylindrical hole to the light source photodiode, and some light emanates through the transparent vessel and the fluid mixture to be reflected by the housing to the pretreat photodiode; and calculating the percentage of a pretreat fluid in the fluid mixture using the data provided by the light source photodiode and the pretreat photodiode to the microprocessor.

17. The method of claim 16, further comprising the step of adding a light filter to the cylindrical hole between the light source and the transparent vessel to filter the light emanating from the light source to improve the response of the system.

\* \* \* \* \*